A. A. BENNETT.
LOCK FOR AUTOMOBILES.
APPLICATION FILED JUNE 19, 1913.
1,074,238.
Patented Sept. 30, 1913.
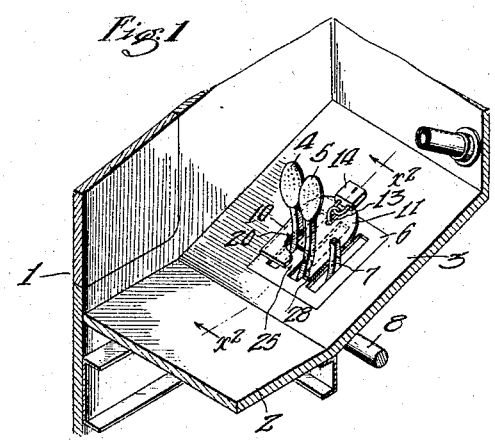
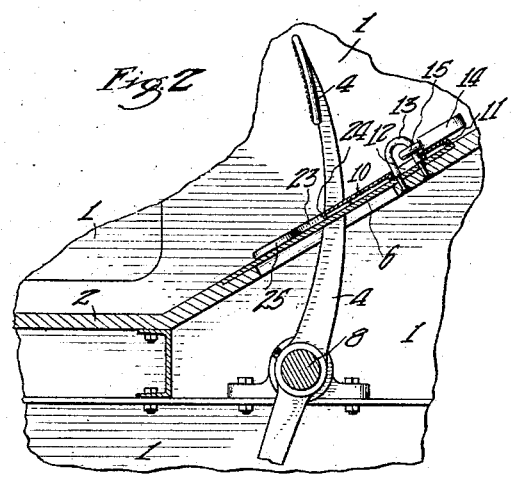
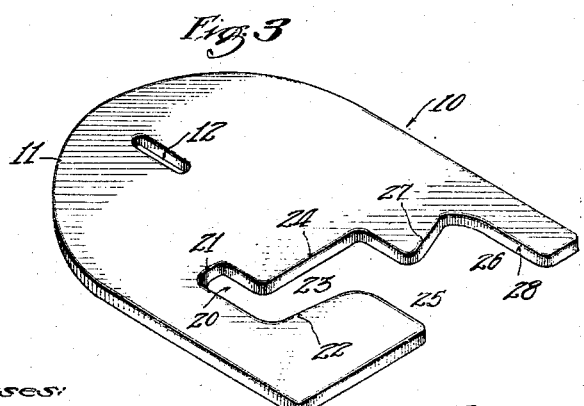
Witnesses:
J. M. Mansfield
Ford W. Harris
Inventor,
Albert Austin Bennett;
by Townsend Graham
his attys.

UNITED STATES PATENT OFFICE.

ALBERT AUSTIN BENNETT, OF LOS ANGELES, CALIFORNIA.

LOCK FOR AUTOMOBILES.

1,074,238.  Specification of Letters Patent.  Patented Sept. 30, 1913.

Application filed June 19, 1913. Serial No. 774,710.

*To all whom it may concern:*

Be it known that I, ALBERT AUSTIN BENNETT, a citizen of the United States, residing at Los Angeles, in the county of Los Angeles and State of California, have invented a new and useful Lock for Automobiles, of which the following is a specification.

My invention relates to locks for automobiles and particularly to those which have the gear shift and reverse levers operated by the feet as in the well known Ford car.

The principal object of my invention is to provide means whereby these levers may be locked. When these levers are so locked it is impossible to connect the engine with the driving wheels as the gears are out of mesh.

Further objects and advantages will appear hereinafter.

Referring to the annexed drawing which is for illustrative purposes only: Figure 1 is a general perspective view of the lock applied to the gear levers of a Ford automobile, the brake lever being shown broken off to show the lock more clearly. Fig. 2 is a sectional elevation on the line $x^2$—$x^2$ of Fig. 1 looking in the direction of the arrows. Fig. 3 is a perspective view of the locking plate.

My invention is illustrated as applied to an automobile body 1 having a floor 2 provided with an inclined portion 3 through which levers 4 and 5 project. The opening through the floor has a plate 6 placed thereon. A lever 7 for operating the brake is also commonly provided especially in the Ford automobile above referred to. In Fig. 1 this lever is broken off to allow the parts beyond to be more clearly seen. All these levers operate about a shaft 8 placed below the floor 3 of the automobile 1.

My invention is especially adapted to lock the levers 4 and 5. It may be extended to lock the lever 7 if desired but as this lever commonly actuates the brake I do not find that such locking is desirable. For example: if an automobile provided with my invention be left in a position needed urgently, for example, by the fire department, it is possible to release the brake and move the automobile to another location by application of external power.

My invention resides particularly in a peculiarly shaped locking plate 10. This plate may be made of cast or punched metal, the drawings illustrating a punching or stamping. This plate 10 has an upper end 11 which may be semicircular as shown or of any general shape desired. In this end is a locking slot 12. This slot is of such a size that it fits closely about a staple 13 which is secured to the plate 6. A padlock 14 having a hasp 15 adapted to snap through the staple 13 is provided.

The lower portion of the plate 10 has a peculiarly shaped slot therein. This slot consists of a gear lever opening 20 having an upper wall 21 and a lower wall 22. In open communication with the gear lever opening 20 is an intermediate slot 23 formed between the gear opening wall 22 and an intermediate slot upper wall 24. The intermediate slot 23 is in open communication with an entering slot 25. This entering slot has a portion 26 formed with an upper wall 27 and a side wall 28 which forms an opening for the reverse gear lever 5.

The method of application of this locking plate to an automobile is as follows: The plate 10 is taken in the hand and the lever 4 is slipped into the slot 20 through the slots 25 and 23. When it arrives in the slot 20 the reverse lever 5 is in place in the slot 26. The plate 10 is then forced down until the staple 13 projects through the slot 12 in the plate 10 and the hasp 15 of the padlock 14 is snapped in place. The plate then is in the position shown in Fig. 1 and Fig. 2. When in this position the levers 4 and 5 are securely locked for the following reasons: The lever 4 is in its central position and in this position neither the high or low gear is engaged. The plate 10 being secured by the lock 14 against any movement parallel to the floor of the car the wall 21 prevents a movement of the lever 5 in one direction and the wall 22 prevents a movement in the opposite direction. Since the angle formed by the lever 4, and the upper portion 11 of the plate 10 is an acute one, the lever 4 projects over the plate and the engagement of the wall 21 with the lever 4 prevents the plate 10 being lifted. The plate 10 is therefore securely locked in place. The lever 5 which is pressed upwardly to throw the reverse gear into action is in its lower or disengaged position and the wall 27 of the slot 26 prevents this gear from being engaged.

I claim as my invention:

1. In combination with an automobile having separate forward and reverse gear levers, a locking plate provided with walls for securing said forward and reverse gear levers in the disengaged positions, and locking means for securing said locking plate to the automobile.

2. In combination with an automobile having separate forward and reverse gear levers, a locking plate having an opening fitting about said forward gear lever when said forward gear lever is in the disengaged position and a wall fitting against the reverse gear lever when said reverse gear lever is in the disengaged position, and locking means for securing said plate to the automobile.

3. In combination with an automobile having separate forward and reverse gear levers, a locking plate having a locking slot therein and a slot adapted to lock the forward lever and the reverse lever in the disengaged positions, a staple secured to the automobile so placed as to pass through said locking slot, and a padlock having a hasp adapted to engage said staple above said plate and thereby prevent the removal of said plate.

In testimony whereof, I have hereunto set my hand at Los Angeles, California, this 13th day of June, 1913.

ALBERT AUSTIN BENNETT.

In presence of—
FRED A. MANSFIELD,
FORD W. HARRIS.